Sept. 20, 1966   A. J. GRINER   3,273,691
PRODUCT FEEDING APPARATUS
Filed Jan. 6, 1964   6 Sheets-Sheet 1

INVENTOR.
ARTHUR J. GRINER
BY
PATENT AG'T.

Sept. 20, 1966  A. J. GRINER  3,273,691
PRODUCT FEEDING APPARATUS
Filed Jan. 6, 1964  6 Sheets-Sheet 2

Fig. 2.

INVENTOR.
ARTHUR J. GRINER
BY

PATENT AG'T.

Sept. 20, 1966    A. J. GRINER    3,273,691
PRODUCT FEEDING APPARATUS
Filed Jan. 6, 1964    6 Sheets-Sheet 4

INVENTOR.
ARTHUR J. GRINER
BY
PATENT AG'T.

United States Patent Office 3,273,691
Patented Sept. 20, 1966

3,273,691
PRODUCT FEEDING APPARATUS
Arthur J. Griner, Wykoff, N.J., assignor to National
Biscuit Company, a corporation of New Jersey
Filed Jan. 6, 1964, Ser. No. 335,996
13 Claims. (Cl. 198—34)

The present invention pertains to improvements in product feeding apparatus.

In the quantity production and packaging of food articles such as cookies, crackers and the like by continuous line methods, the handling of the successive articles by direct mechanical feed means in certain stages places a definite restriction on the over-all speed of the production line, due to the fragility of such articles inherent in their desirable food qualities. A typical such stage is that calling for picking off the articles one by one from a closely stacked or overlapped advancing column and delivering them in definitely spaced flat succession to a subsequent handling stage. Such an operation entails initial sudden grasping and acceleration of the successive units which, if carried out at too high speed by mechanical fingers or flights, can often result in extensive breakage and loss of proper product control. In view of the above and related considerations, an object of the present invention is to provide improved feeding apparatus adapted to separate and move fragile food articles from a massed supply condition to a pre-determined successively spaced delivery condition purely by frictional traction.

A further object is to provide apparatus of the above nature which is adapted to continuous and reliable operation at high speeds.

A further object is to provide apparatus of the above type including conveying means and rotary vacuum-applying means to establish firm frictional driving traction between each product unit and the conveying means.

A further object is to provide apparatus of the above type including means for automatically adjusting the speed of feed to the requirements of the delivery station.

A further object is to provide a hollow rotary drum having axially spaced exterior belt pulley zones and an annular land between them, the land being provided with at least one orifice or group of orifices leading into the drum's interior, and means to apply vacuum to the orifice or orifices from the interior of the drum throughout a pre-determined arc of the drum's rotation.

Another object is to provide feeding apparatus of the above nature adapted to gang construction for simultaneous feeding from a number of parallel supply lines, and if desired, including means to combine parallel feeds into a lesser number of lines as required at the delivery station.

Other objects and advantages of the invention will become evident during the course of the following description in connection with the accompanying drawings, in which

FIGURE 8-A similarly illustrates a condition wherein tendency to unnecessary delivery accumulation automatically slows down the feed;

FIGURE 8-B similarly illustrates automatic speed up of the feed when delivery reserve decreases unduly;

Figure 1:
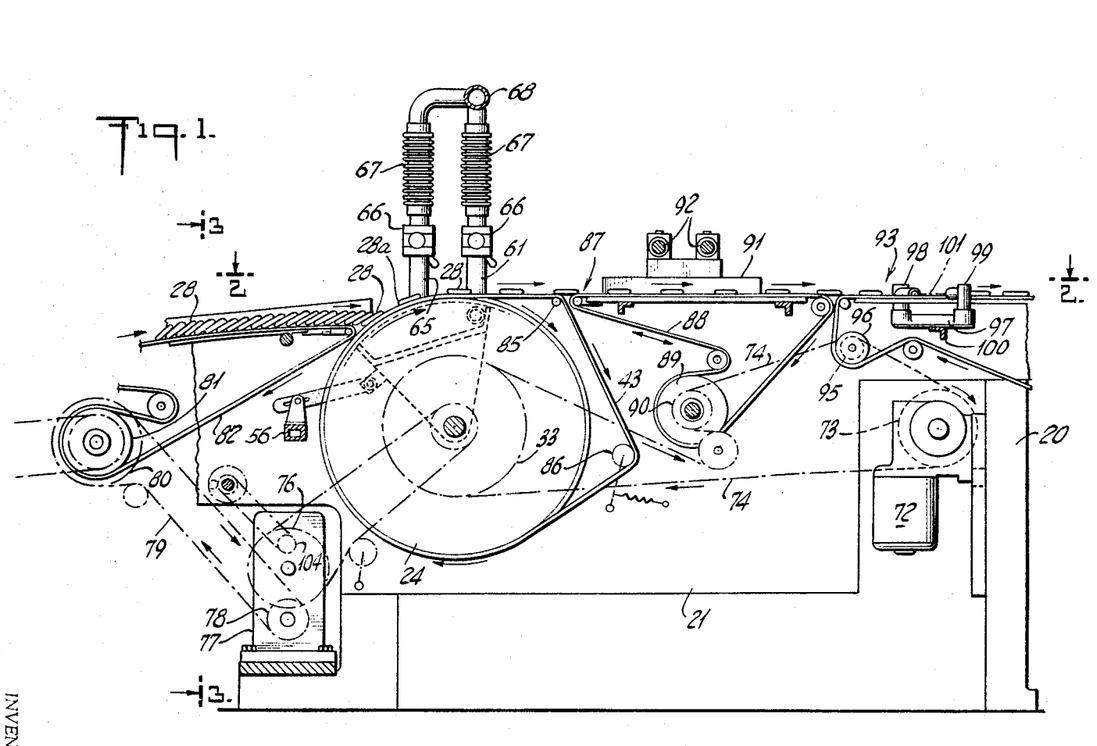
FIGURE 1 is a longitudinal partially sectional side view of a preferred form of the invention.
Figure 2:
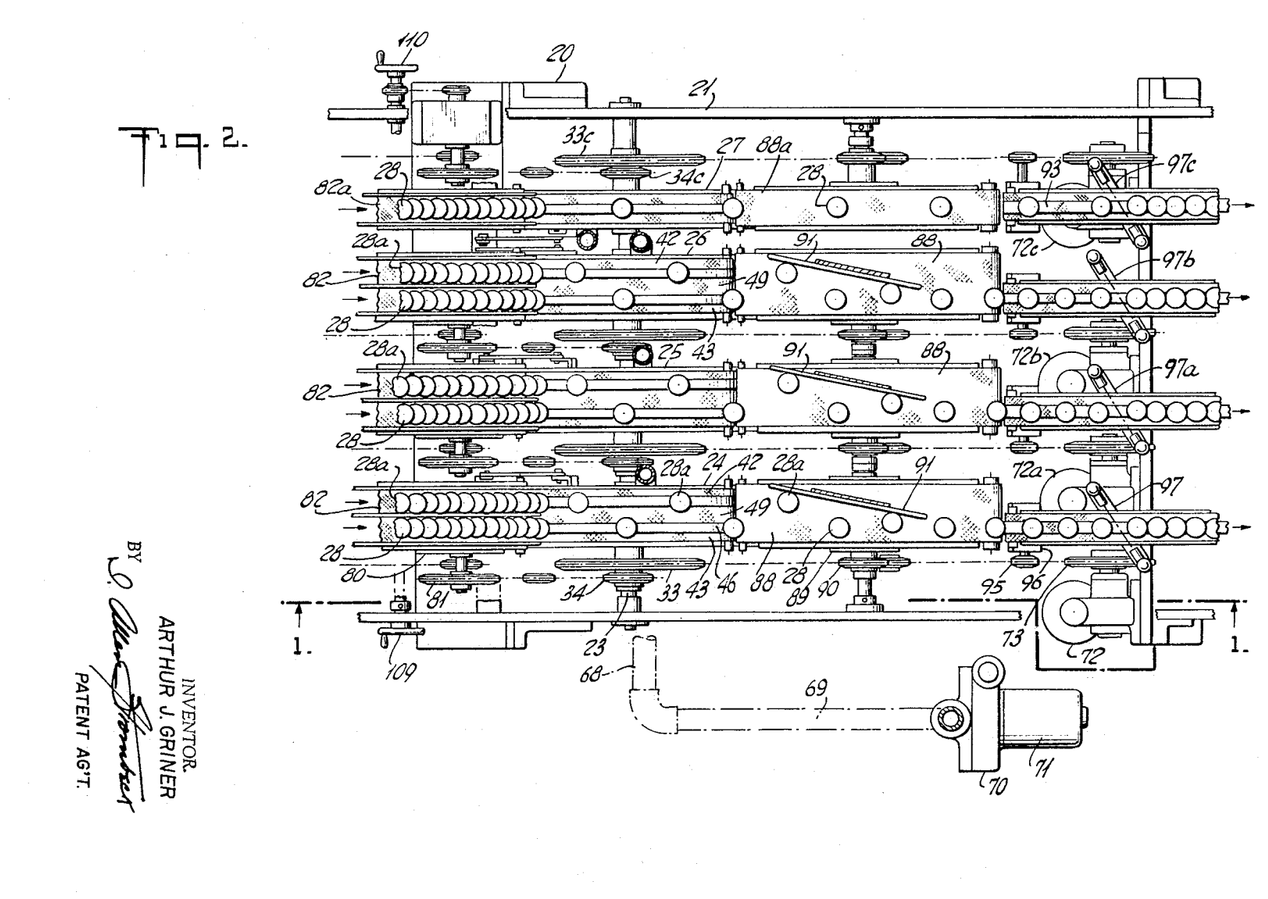
FIGURE 2 is a plan view generally in the plane 2—2, FIGURE 1.
Figure 3:
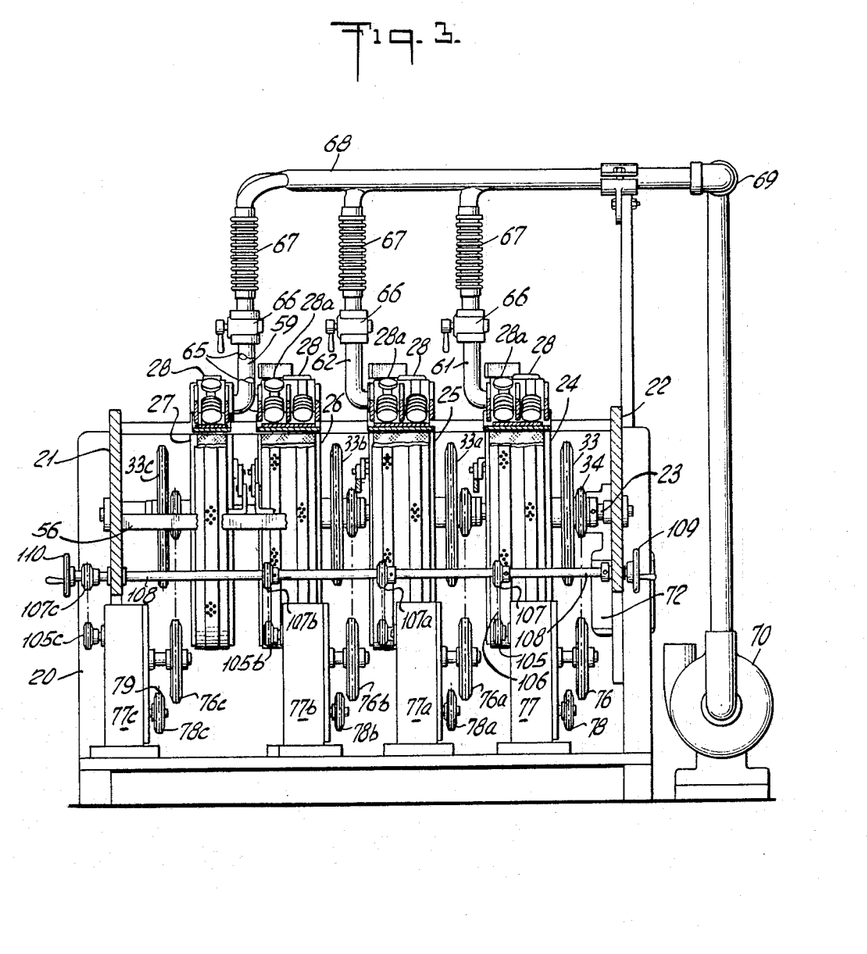
FIGURE 3 is a transverse sectional view in the plane 3—3, FIGURE 1.

Referring to FIGURES 1, 2 and 3, the numeral 20 indicates a machine frame having heavy side mounting plates 21 and 22. A stationary cross shaft 23, secured to the side plates 21 and 22, has rotatably mounted thereon four drums 24, 25, 26 and 27, disposed in parallel spaced relation as shown in FIGURES 2 and 3. In the present embodiment the drum 27 is relatively narrow, being adapted to feed a single succession of product articles 28, herein shown and referred to for typical example as cookies. The remaining three drums 24, 25 and 26 are similar in general structure to drum 27 except that they are of greater width and each is adapted to feed two parallel rows of cookies, those of the second row being designated 28a to distinguish them clearly from first row cookies 28 in the subsequent description. The typical detail structures and preferred mountings of the narrow or "single-track" neighbor drums 26, etc., are shown in FIGURES 4 and 5.

Figure 4:
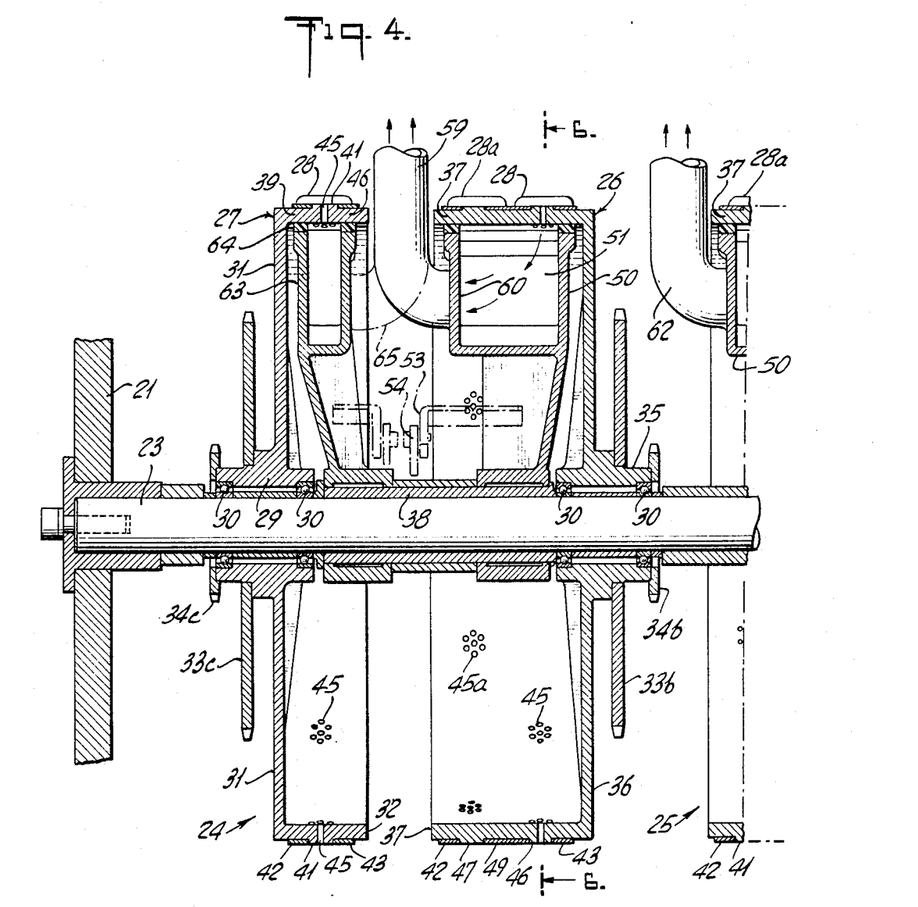
FIGURE 4 is an enlarged detail cross sectional view of the single track and one of the double track drums.
Figure 5:
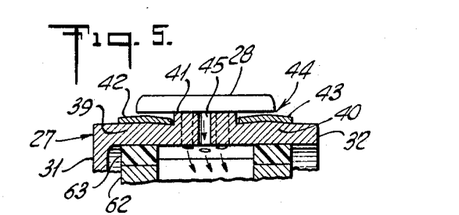
FIGURE 5 is a further enlarged fragmental section illustrating typical detail dimensional relation of the drum rim and associated conveyor tapes.

Referring first to FIGURE 4, it will be seen that the drum 27 includes a hub 29 mounted via bearings 30 on the shaft 23 and formed, preferably integrally, with a flat circular end plate 31 carrying an outer cylindrical rim 32. Secured to the hub 29 outboard of the end plate 31 is a roller chain sprocket 33C of relatively large diameter and a second smaller but otherwise similar sprocket 34C.

Similarly, the drum 26 which as previously noted, is typical of all three "double track" drums, has a hub 35 which carries the flat end plate 36 and the relatively wide cylindrical rim 37 making up the body of the drum, the hub 35 also being mounted on bearings 30 and being equipped with large and small sprockets 33B and 34B respectively. A sleeve 38 determines the relative spacing of the drums along the shaft 20.

The periphery of the drum 27 is made up of two pulley zones 39 and 40 with an annular land 41 of greater diameter between them. Thin conveyor belts or tapes 42 and 43 engage the pulley zones 39 and 40 respectively. Since the high degree of scale reduction imposed by patent sheet limitations on the over-all drum showings in FIGURE 4 render certain details and relationships of the drum rim and conveyor tapes too small for practical clarity in illustration therein, these details are preferred are shown in enlarged form in FIGURE 5. Referring to this figure, it will be noted that the pulley zones 39 and 40 are slightly crowned to maintain proper centering of their respective belts or tapes in the well known manner of flat belt power drives. The radial extent of the central land 41 is sufficiently greater than that of the pulley zones plus the tape thickness that when a cookie 28 engages the land 41, a small clearance 44 exists between the tapes and the overlying portions of the cookie. The land 41 is perforated by groups of small holes 45 spaced at regular intervals around the circumference thereof, the number of groups per land in the present embodiment being eight, i.e., a group of holes at each 45 degrees of circumference.

Figure 6:
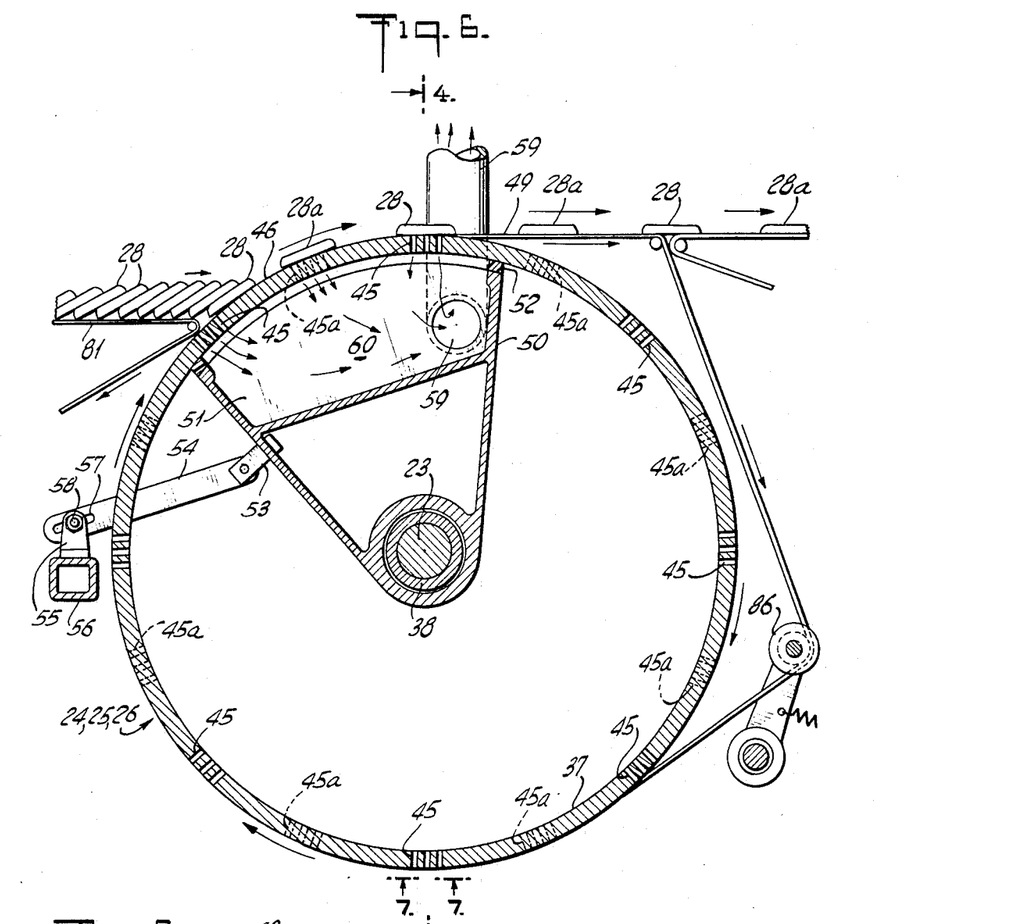
FIGURE 6 is an enlarged axially directed sectional view of a typical drum, taken in the plane 6—6, FIGURE 4.

The peripheral structure of the typical double track drum 26 is the same in detail as that shown in FIGURE 5 except that it includes two lands 46 and 47 with a wide pulley zone 48 and tape 49 between them, thus providing for operation with two parallel lines of cookies 28 and 28a. The lands 46 and 47 are provided with groups of holes 45 and 45a respectively, as previously described but with the groups of the two rows circumferentially staggered as shown in FIGURES 4 and 6.

A vacuum chamber structure 50 shaped substantially as a sector centered about the shaft 23 and rotatably mounted on the spacer sleeve 38, contains a chamber 51 exposed to the inner rim surface of the drum 25 and provided with an edge shoe 52 of nylon or the like forming a sliding seal with the rim surface. As shown in FIGURE 6, the structure 50 has secured thereto an angle member 53 connected by a link 54 to a bracket 55 on a stationary cross frame tube 56. The link 54 is slotted at 57 and secured to the bracket 55 by a bolt 58 engaging the slot, so that with the bolt loosened, the position of vacuum chamber structure may be circumferentially adjusted, after which, tightening the bolt 58 locks the structure in the desired setting. A conduit or riser 59 leading through the wall structure 60 and directed upward clear of the drum, provides for connection to a source of vacuum as hereinafter set forth. Each of the other "double track" drums 24 and 25 is provided with a vacuum chamber structure identical with that described, the vacuum supply conduits or risers for these drums being designated 61 and 62 respectively as shown in FIGURE 3. The "single track" drum 27 is also provided with a vacuum chamber structure 63, FIGURE 4, of the same type as that described except that it and its sealing shoe 64 are narrower in accordance with the single row construction, and that its vacuum conduit 65 is placed forward of the transverse section shown in FIGURE 4 in order to clear the neighboring conduit 59.

The described vacuum conduits from all the drums lead upward via regulating valves 66 and flexible tubing sections 67 to an overhead manifold 68 as shown in FIGURES 1 and 3. The manifold 68 is connected through suitable piping 69 to a high volumetric capacity vacuum pump 70 driven by a motor 71, FIGURE 2. While the four vacuum feed drums 24, 25, 26 and 27 act in concert to feed the parallel lines of product articles as hereinafter set forth, each drum in combination with its related conveyor elements is provided with its individual driving and control means, in order to maintain proper continuity and synchronism of delivery at the common receiving station. Since the general combination of related driving and conveying elements is the same in each of the parallel feeding combinations, that shown in FIGURE 1 is presented as typical.

Referring to FIGURE 1, the numeral 72 designates a variable speed motor having an output driving sporcket 73 operatively connected to the driven sprocket 33 of the drum 27 by a roller chain 74. The smaller sprocket 34, previously described as mounted, together with sprocket 35 on the hub of drum 24, is connected by a second chain 75 with the input sprocket 76 of an adjustable ratio positive drive unit 77. The unit 77 has an output sprocket 78 from which a chain 79 runs to a sprocket 80 adapted to actuate a pulley 81 driving an input conveyor belt 82. The upper reach of the belt 82 runs on a guide plate 83 terminating in a "toe" roller 84 closely adjacent the periphery of the drum 27. The upper surface of the belt 82 carries a succession of cookies 28 closely stacked in forwardly inclined overlapping or "shingled" relation, the cookies having been supplied in this relation by any suitable loading means.

The drum-driven conveyor tape 43 (together with its companion tapes 42 and 49 described in connection with FIGURE 4), is led on a horizontal tangent outward from the drum 24 to a small terminal roller 85, thence downward and back via suitable spring-pressed tightening idler means 86 to the drum. A third conveyor 87, aligned horizontally with the drum tapes and adapted to receive cookies therefrom, includes a single belt 88 which is of width spanning the axial extent of the drum 27, as shown in FIGURE 2. The belt 88 is driven, via a pulley 89 and sprocket 90, by the main drive chain 74 from the motor 72. A rail 91, supported on cross members 92 so as barely to clear the belt 88, is angularly disposed as shown in FIGURE 2, its purpose being to combine the second row cookies 28a with those of the first row 28 in alternately interspersed relation as hereinafter set forth.

A fourth conveyor 93, aligned with the conveyor 87 and comprising at the same time the final receiving station of the feeding apparatus and the means for orderly delivery to any desired subsequent processing unit or combination, also has its belt or belts 94 driven from the main chain 74 via sprocket 95 and pulley 96.

Figures 9, 10:
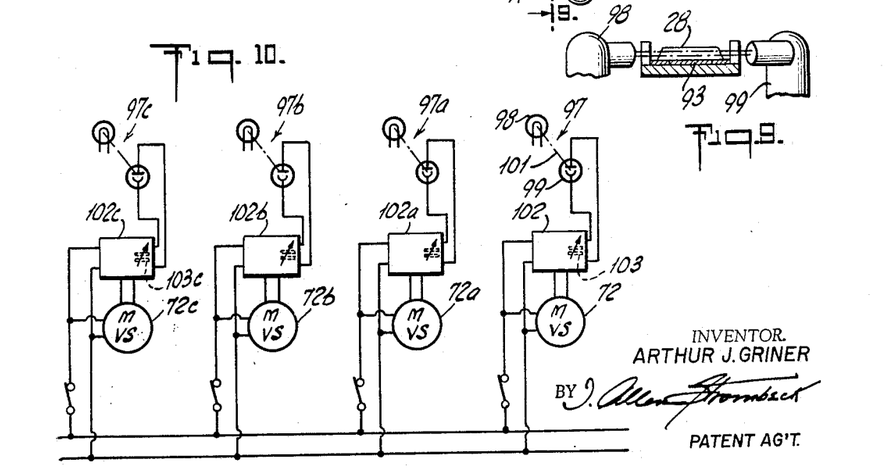
FIGURE 9 is a fragmental section in the plane 9—9, FIGURE 8-B, illustrating the vertical relationship of the conveyor, photo-electric operating light beam, and a product unit.
FIGURE 10 is a block diagram illustrating the photo-electric control of the feed driving means.

An "electric eye" control unit 97, including a photocell 98 and a light source 99, is supported by a frame member 100 in such position that the beam of light 101 from the source 99 to the cell 98, if uninterrupted, passes across the conveyor just above the surface of the belt or belts 94. As illustrated in block diagram in FIGURE 10, the light source 98 and photo-cell 99 are operable via amplifying means 102 in a well-known manner to control the speed of the variable speed main drive motor 72. The amplifying combination 102 includes time delay means 103, the purpose of which will appear in the subsequent description of the machine's operation.

As previously set forth, each of the remaining feed systems served by the other drums 25, 26 and 27 has its individual driving combination as described and as shown in FIGURE 2, the drives originating with motors 72a, 72b and 72c respectively controlled by "electric eyes" 97a, 97b and 97c. However, while the absolute speeds of the four systems are individually controlled automatically as noted, common means is provided for simultaneously adjusting the internal ratio between initial infeed and delivery speeds in all four systems. Referring to FIGURE 1 and the adjustable speed unit 77 therein, the numeral 104 indicates the usual adjusting spindle for setting the rotational speed ratio between the previously noted sprockets 76 and 78, which latter sprocket drives the also previously described input apparatus via the chain 79. The spindle 104 carries a small sprocket 105 connected by a chain 106 to a second small sprocket 107 secured on a cross shaft 108, which shaft extends throughout the entire width of the machine as shown in FIGURE 3 and is equipped with exterior hand wheels 109 and 110. The adjusting sprockets 105a, 105b, and 105c of variable ratio units 77a, 77b, and 77c are similarly chain-connected to respective sprockets 107a, 107b, and 107c on the cross shaft 108. Thus it will be evident that rotation of the cross shaft 108 by means of either hand wheel 109 or 110 effects corresponding ratio adjustments in all four units 77, 77a, 77b, and 77c.

*Operation*

In the following description, since the structures and operation of the three "double-track" drums 24, 25 and 26 are identical throughout, the detail sectional views of drum 26 in FIGURES 4 and 6 are utilized as representative in connection with the exterior views of drum 24 in FIGURE 1 and all three such drums in FIGURE 2, in order to avoid undue duplication of identical showings.

The four main motors 72, 72a, 72b, 72c, and the vacuum pump motor 71 being activated, cookies from the previously mentioned supply source enter the present machine in parallel rows as shown in FIGURE 2, the three double width conveyor belts 82 each carrying two rows of cookies 28 and 28a while the narrower belt 82a associated with the drum 27 carries only its single row 28. The interaction between the drums and the cookies supplied thereto is best illustrated in enlarged FIGURE 6. Referring to this figure, it will be seen that the relatively slowly travelling belt 81, carrying the column of forwardly inclined overlapping or "shingled" cookies, moves the foremost or leading cookie 28 into engagement with the rapidly moving drum periphery near the top of the drum, just within the arc defined by the angular extent of the internal vacuum chamber 51. Due to the characteristic proportions of the drum rim and tape structure as illustrated in enlarged FIGURE 5, the cookie 28 initially engages only the land 46. So long as the cookie's contact is with an unperforated portion of the land's smooth and rapidly moving periphery, the latter exerts insufficient frictional drag to dislodge the cookie 28 from its following column. However, when a group of holes 45 under-rides the cookie 28, the powerful suction through the holes to the vacuum chamber 51 is exerted on the inner surface of the cookie, clutching the latter firmly to the drum's periphery. By this means the cookie 28 is separated or snatched from the advancing column and carried upward and over the top of the drum, as shown in FIGURE 6.

Figure 7:
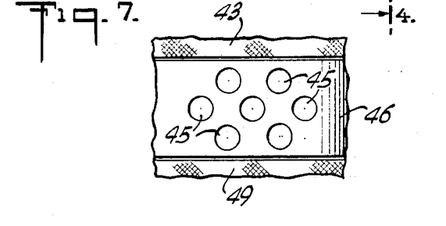
FIGURE 7 is an enlarged fragmental view illustrating a typical group of vacuum orifices or nozzles as provided in the peripheries of the feed drums.

It will be noted that in the preferred form of the device as illustrated, the outer diameter of the drum land 46 is relatively great in comparison to the diameter of the cokie 28, so that the curvature in the small peripheral area underlying the cookie is so slight as virtually to coincide with the flat under side of the cookie itself, thus facilitating the clutching action as described. The distribution of the vacuum application among a number of small holes or nozzles 45 in characteristic grouping, as illustrated in enlarged FIGURE 7, spreads the vacuum effect throughout a relatively large face area of the cookie 28, thus placing minimum localized stress on a fragile product. In the same aspect, the initial process of clutching while the group of small nozzles 45 moves under the leading cookie 28, is relatively gentle, so that the quick acceleration of the cookie from a virtually static condition to one of high speed controlled travel is carried out without appreciable shock to the product. Another advantage of the grouped small vacuum nozzle provision lies in the fact that it renders the device applicable to the processing of articles so shaped as to leave one or more of the vacuum holes exposed, for example cookies formed with a hole in the middle thereof. In such case the remaining unexposed holes 45 effectively carry out the clutching action as set forth, due to the ample vacuum supplied within the chamber 51 by the pump 70 and previously described intermediate connections.

As the cookie 28 passes over and beyond the top of the drum land 46 it is deposited on the tangentially extending tapes 49 and 43 which run closely beside the land 46 as shown in plan FIGURE 2. Returning to FIGURE 6, it will be noted that the angular setting of the inner vacuum structure 50 is such that the nozzles 45 remain in communication with the inner chamber 51 throughout a short distance beyond the point of tangency of the tapes. Thus the tapes in effect pry or strip the cookie 28 from the land 46 against the final grip of the vacuum, which latter thereby establishes a firm frictional traction between the cookie and the tapes. By this means the successive cookies 28 are deposited on the moving tapes 46 and 43 and are delivered thereby to the next conveyor belt 88 at regularly spaced intervals as shown in FIGURE 2, the conveyor belt 88 in the present embodiment being driven at the same time or approximately the same linear speed as the described delivering tapes.

In the case of each of the typical double track drums 24, 25, or 26, the second circumferential succession of vacuum nozzle groups 45a operates to extract the cookies 28a from their "shingled" supply column and deposit them via the tapes 49 and 42 on the conveyor belt 88 in the manner described, but due to the angularly staggered arrangement of the vacuum nozzle groups 45 and 45a, the cookies 28a of the second row reach and initially are carried forward by the belt 88 in zig-zag or linearly parallel staggered relation to the "first row" cookies 28 as shown in FIGURE 2.

As the belt 88 carries the two rows of cookies forward, the "second row" cookies 28a encounter the angular guide rail 91, which carries them into linear positions intermediate the "first row" cookies 28, thus completing the combination of the originally supplied two closely stacked columns of cookies in a single row in regularly spaced flat relation. In this arrangement they are transferred to the final belt conveyor 93 for delivery thereby to whatever device may constitute the next section in the particular production line in which the present invention is incorporated. Typical operation of this final stage of the invention, including the speed control thereof, is shown in enlarged FIGURES 8, 8–A, and 8–B, in which it is assumed for purposes of illustration that the device to be fed is of a nature calling for admission of the cookies one by one via a metering gate represented by intercepting side flights or fingers 111, the latter being understood as driven from the receiving device by any suitable mean independent of the present invention's described driving system.

Figure 8:
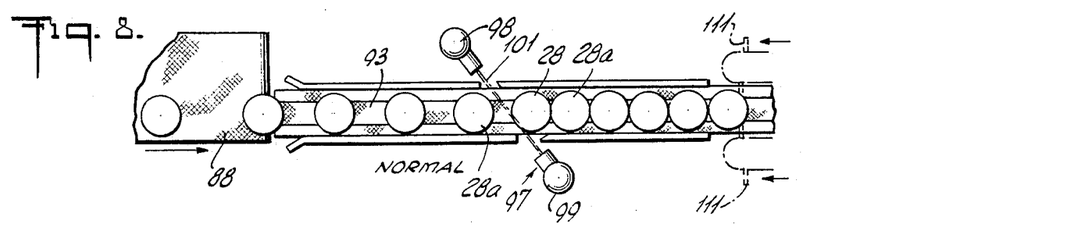
FIGURE 8 illustrates in plan the relationship of the photo-electric control means and the advancing product under normal or average feed conditions.
Figure 8A:
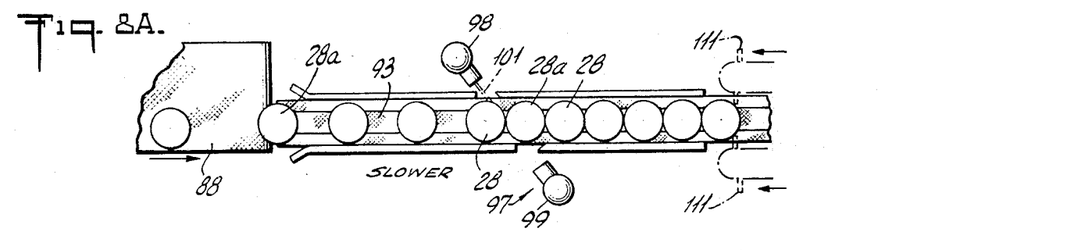
Figure 8B:
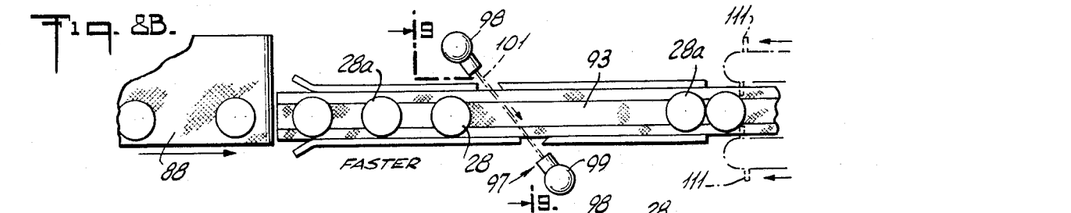

To ensure accurate continuous final feed to the receiving device, the speed of the belt 98 and its related apparatus is so controlled as to establish and maintain a short abutting accumulation of cookies 28 and 28a urged toward the flights 111, as shown in FIGURE 8. This effect is brought about through the agency of the "electric eye" combination 97, which is so connected within its amplifying apparatus 102, FIGURE 10, that a continuity of the light beam 101 from the source 98 to the photocell 99 tends to speed up the main drive motor 75, while a cut-off of the beam similarly causes a tendency for the motor to slow down. The time delay device 103 serves to cushion these effects so that the alternate cut-offs and restorations of the light beam by cookies passing through the beam in normal spacing as shown in FIGURE 8, do not produce corresponding sudden reversals in motor slow-down and speed-ups.

The normal adjustment of the time delay 103, is such that upon initial starting or following an interruption of cookie feed as hereinafter set forth, the speed of the belt 93 and consequent frequency of cookie approach to the receiving mechanism exceed the latter's timed ability to receive the cookies, so that the previously mentioned abutting accumulation of cookies builds up rearwardly while being urged toward the receiving station or gate by slippage friction of the underlying belt 93. This rearward accumulation continues until the rearmost cookie 28 reaches the path of the light beam 101 so as to cut down the normal "on" period of the beam before cut-off by the next cookie 28a, as shown in FIGURE 8. If the build-up continues to the point of sustained cut-off of the beam 101, as shown in FIGURE 8–A, the effect of the time delay 103 is overcome, slowing down the main drive motor 72 and its entire described feeding connections until the frequency of cookie feed relative to receiving apparatus requirement returns to normal as illustrated in FIGURE 8.

In the opposite condition illustrated in FIGURE 8–B, in which the $a$ gap occurs in the regular successional feed of cookies along the belt 93, due for example to the possible crack-up and consequent loss of one or more defective cookies in the preceding stages of the feed, the relatively long persistence of the detecting light beam 101 causes the motor 72 and with it the entire in-feed apparatus to accelerate, thus speeding cookies at increased frequency to the receiving station so as to prevent any interruption in proper supply thereto, and to rebuild the reserve accumulation of abutting cookies 28 and 28a to the normal state illustrated in FIGURE 8.

The illustrated angular direction of the light beam 101 provides that positive sustained cut off thereof is assured jointly by any two abutting cookies as shown in FIGURE 8–A. This provision prevents restoration or partial restoration of the beam between abutting cookies of conically tapered or inwardly curved formation, a condition which would arise if the light beam were directed at right angles across the path of cookie travel, and which would consequently require undue operational sensitivity in the time delay means as described.

The foregoing operational description, as previously set forth, is typical throughout of each of the "double-track" drums 24, 25, 26 and its respectively associated driving, conveying, and control apparatus. Similarly, the operation of the drum 27 and its associated apparatus is the same as described, except that as only a single line of cookies 28 is served, no combining action is required such as that provided by the angular guide rails 91 employed in the double-row combinations, and that the photo-electric control 97c is adjusted to conform with the normally greater spacing between cookies 28 on the final conveyor belt 93c, FIGURE 2.

In all the four cooperative feeding lines, the surface speeds of the final delivery belts 93 are substantially less than those of their respectively associated vacuum drums and intermediate conveyors, as evinced by the proportions of the typical driving combinations, FIGURE 1, and the consequent closer spacings of the cookies on the belts 93 as shown in FIGURES 2 and 8. This provision prevents any significant shock in the delivery of the cookies to the mechanical handling elements 111 of the station being fed, FIGURE 8, thus carrying out to final delivery the gentle handling of the fragile articles as initiated by the previously described vacuum clutching pick-offs.

From the foregoing it will be evident that the invention provides production line means to transfer fragile food products from a situation of relatively slow massed progression, such as that advantageous for allowing cooling of recently baked products in minimum space, to a condition of individual article control as required in packaging or other further processing, the transfer means being operable at speeds limited only by the capacities of the input and take-away mechanisms associated therewith, while at the same time maintaining "gentle handling" of the fragile product. The adjustability of the variable ratio drive units 77, etc., by turning either hand wheel 109 or 110, FIGURE 3, provides means to set and maintain the most advantageous speed and accompanying angle relation between the feed of articles 28 to the "take away" speeds of the drums themselves, as indicated in FIGURE 6.

The present embodiment has shown the transformation of seven input columns of product units to four required series by the combination employing one "single track" and three "double track" vacuum drums, together with the combining guides 91. Similarly, various combinations of single and/or multiple channel drums may be employed to provide any other practical ratio of input to delivery channels. However, it will be understood that the number of product tracks for which a single vacuum drum is designed need not be limited to two, as for example, a triple track drum may be advantageous in some production line combinations. Thus, while the apparatus has been described in preferred typical form, it is not limited to the exact embodiments illustrated, as various modifications may be made without departing from the spirit of the invention within the scope of the appended claims.

What is claimed is:

1. In product feeding apparatus, in combination, an elongated frame, conveying means supported by said frame and adapted to present a plurality of parallel massed columns of flattened articles, a cross shaft secured in said frame, a hollow drum rotatably mounted on said shaft and adapted to be peripherally engaged by said parallel columns of articles, vacuum means operable through orifices in the periphery of said drum to clutch said articles successively from said columns to said periphery in circumferentially staggered spaced relation second conveying means to strip said articles from said drum against final resistance of said vacuum clutching means, a third conveyor adapted to receive said articles from said stripping conveyor means in said staggered relation and to move the same toward a delivery station, means to drive said conveyors and said drum, and means associated with said third conveyor for guiding said staggered articles into single line delivery relation.

2. In product feeding apparatus, in combination, a stationary shaft, a hollow drum rotatably mounted on said shaft and having a rim including substantially a smooth peripheral land, means forming a circumferentially spaced plurality of groups of perforations in said land and extending through the interior surface of said rim, a normally stationary chamber structure within said drum and forming a chamber in communication with said interior surface of said rim throughout a predetermined circumferential extent thereof, means to maintain a vacuum in said chamber, means to rotate said drum whereby said spaced groups of peripheral perforations are periodically supplied with vacuum from said chamber for clutching flat articles successively to said peripheral land in said circumferentially spaced relation of said groups, and means to strip said articles successively from said land.

3. The combination according to claim 2 wherein said chamber structure is mounted on said stationary shaft in rotationally adjustable relation, and including exterior means to adjust said structure to optimum operational position and to anchor the same in said position.

4. The combination according to claim 2 wherein said stripping means includes conveyor tapes operatively disposed on said rim adjacent said land and underlying portions of each of said clutched products, and means guiding said tapes tangentially away from said drum at a point operationally prior to cut-off of said clutching vacuum through said orifices from said vacuum chamber, whereby effective frictional traction may be established between said articles and said tapes.

5. In product handling apparatus, in combination, a frame, a stationary cross shaft secured in said frame, a plurality of hollow drums rotatably mounted on said shaft, each of said drums having a circumferentially spaced plurality of groups of nozzle apertures in the cylindrical periphery thereof and defining an aligned feeding track, an individual infeed conveyor associated with each of said drums and adapted to feed a column of forwardly overlapping flat articles toward said drum in line with said feeding track, whereby the flat surface of the foremost of said articles may engage said periphery in substantially tangential relation, individual output conveying means associated with each of said drums in line with said respective feed tracks thereon and adapted to convey articles to a delivery station, an individual variable speed motor connected in driving relation to each of said combinations of revolving drum, infeed and output conveying means; means to maintain vacuum within said drums in communication with said groups of apertures in said respective feed tracks, whereby said infed articles in said columns may be successively clutched to said respective drums in said circumferentially spaced relation, individual means to strip said articles from said respective drums and to transmit said articles to said respective output conveying means, and individual photo-electric means for controlling the individual speeds of said driving motors, each of said photo-electric control means being operatively responsive to the spatial relationships of said successive product articles on each of said respective output conveying means adjacent said delivery station.

6. Apparatus according to claim 5 wherein said drums are of large diameter relative to the maximum dimension of each of said flat articles, whereby the clutched flat areas of said articles may be closely associated with the underlying arcuate peripheral clutching areas of said drums.

7. Apparatus according to claim 5 wherein at least one of said drums has a second circumferential spaced plurality of groups of said nozzle apertures defining a second feeding track parallel to said first feeding track, wherein said infeed conveyor means associated with said drum is adapted to supply a column of said food articles to each of said parallel feeding tracks, and including means cooperative with said output conveying means to combine the two related lines of spaced articles stripped from said drum in a single line directed to said delivery station, whereby a predetermined plurality of said columns of flat articles fed to said combination of drums may be converted to a predetermined lesser plurality of product article rows presented at said delivery station.

8. Apparatus according to claim 5 including means to vary the speed ratio between each of said drums and its said associated infeed conveyor, and common means for simultaneously adjusting all of said ratio-varying means.

9. In apparatus for feeding relatively thin and fragile food articles each having a flattened under face of predetermined areal dimensions, in combination, a rotatable hollow drum including a rim formed with a cylindrical outer peripheral surface having a radius of curvature great in proportion to the maximum of said article areal dimensions, whereby an area of said cylindrical surface underlying said under face of a said food article placed thereon may closely approach the flatness of said article's applied under face, means forming a plurality of nozzle apertures in said peripheral surface in circumferentially spaced relation, means to urge an over-lapping column of said fragile food articles into substantially tangential engagement of said flat under surface of the foremost of said urged column with said peripheral drum surface in line with said nozzle apertures, means to furnish vacuum from within said drum through said nozzle apertures, whereby said forwardly urged fragile food articles may successively be clutched by said vacuum to said drum in said circumferentially spaced relation, and means to strip said successive articles from said drum in substantially said spaced relation.

10. Apparatus according to claim 9 wherein said vacuum furnishing means includes normally stationary means within said drum and forming with the interior of said revolving drum rim a chamber in successive communication with said nozzle apertures, a vacuum pump, and conduit means including a flexible tubing section to connect said chamber to said pump.

11. Apparatus according to claim 9 wherein said vacuum furnishing means includes normally stationary means within said drum and forming with said drum rim a chamber defining a predetermined arcuate clutching zone of communication of said clutching apertures with said chamber, a vacuum pump, and conduit means operatively connecting said pump to said chamber.

12. Apparatus according to claim 9 wherein said vacuum furnishing means includes normally stationary means within said drum and forming with said drum rim a chamber defining a predetermined arcuate clutching zone of communication of said clutching apertures with said chamber, a vacuum pump, conduit means including a section of flexible tubing connecting said pump to said normally stationary chamber-forming means, and exterior means to adjust the operative position of said vacuum chamber defining means concentrically with said drum.

13. Apparatus according to claim 9 wherein said plurality of nozzle apertures comprises a plurality of localized area groups of relatively small apertures disposed as groups in said circumferentially spaced relation, whereby application and release of said vacuum clutching action to and from said fragile food articles may be carried out with minimum structural stress on said articles.

References Cited by the Examiner

UNITED STATES PATENTS

| 1,755,080 | 4/1930 | Schunemann | 198—25 X |
| 1,920,563 | 8/1933 | Jahne | 198—35 |
| 1,976,855 | 10/1934 | McKee | 198—34 |
| 2,611,470 | 9/1952 | Rudolph | 198—35 |
| 2,796,258 | 6/1957 | Beck | 271—29 |
| 2,856,187 | 10/1958 | Burckhardt | 271—34 X |
| 3,155,221 | 11/1964 | Griner | 198—34 |

FOREIGN PATENTS 495,614    3/1930   Germany.

EVON C. BLUNK, *Primary Examiner.*

WILLIAM B. LA BORDE, RICHARD E. AEGERTER, *Examiners.*